US009074560B2

(12) United States Patent
Kim et al.

(10) Patent No.: US 9,074,560 B2
(45) Date of Patent: Jul. 7, 2015

(54) APPARATUS AND METHOD FOR CONTROLLING EXHAUST GAS RECIRCULATION

(71) Applicants: Hyundai Motor Company, Seoul (KR); Kia Motors Corporation, Seoul (KR)

(72) Inventors: Seungbum Kim, Seongnam-si (KR); Jeong Nam Park, Seoul (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 395 days.

(21) Appl. No.: 13/718,160

(22) Filed: Dec. 18, 2012

(65) Prior Publication Data

US 2013/0255650 A1    Oct. 3, 2013

(30) Foreign Application Priority Data

Mar. 27, 2012    (KR) .................. 10-2012-0031163

(51) Int. Cl.
| | |
|---|---|
| *F02B 47/08* | (2006.01) |
| *F02M 25/07* | (2006.01) |
| *F02D 21/08* | (2006.01) |
| *F02D 41/00* | (2006.01) |

(52) U.S. Cl.
CPC .......... *F02M 25/0753* (2013.01); *F02B 47/08* (2013.01); *F02D 21/08* (2013.01); *F02D 41/0072* (2013.01); *F02D 2041/007* (2013.01); *F02D 2200/0402* (2013.01); *F02D 2200/0406* (2013.01); *F02D 2200/0414* (2013.01); *F02D 2200/501* (2013.01); *F02D 2200/602* (2013.01); *Y02T 10/47* (2013.01); *Y02T 10/42* (2013.01)

(58) Field of Classification Search
CPC    F02M 25/0753; F02D 41/0072; F02D 21/08;
F02B 47/08
USPC ................... 123/568.21; 701/108; 73/114.31, 73/114.37, 114.74
See application file for complete search history.

(56) References Cited

U.S. PATENT DOCUMENTS

| | | | |
|---|---|---|---|
| 6,993,909 B2 * | 2/2006 | Matsunaga et al. .......... | 60/605.2 |
| 2004/0089061 A1 * | 5/2004 | Matsunaga et al. .......... | 73/118.1 |
| 2006/0048760 A1 * | 3/2006 | Matsunaga et al. ...... | 123/568.21 |

FOREIGN PATENT DOCUMENTS

DE    10 2012 113 131 A1 * 10/2013 .............. F02D 21/08

\* cited by examiner

*Primary Examiner* — Hai Huynh
(74) *Attorney, Agent, or Firm* — Morgan, Lewis & Bockius LLP

(57) ABSTRACT

An exhaust gas recirculation control apparatus includes: an EGR valve adjusting a flow rate of EGR gas recirculated from an exhaust manifold to an intake manifold; a manifold absolute pressure (MAP) sensor measuring pressure inside the intake manifold; a throttle valve controlling the amount of inflow air; an igniter spraying fuel; an acceleration pedal angular position sensor; a crank position sensor measuring engine RPM; a vehicle speed sensor measuring a speed of a vehicle; and a control portion receiving a pressure signal from the MAP sensor, calculating a ratio of the EGR gas for a total volume of the intake manifold by using pressure variance inside the intake manifold, calculating pressure of the EGR gas by multiplying the pressure of the intake manifold and the ratio of the EGR gas, and converting the pressure of the EGR gas to a flow rate of the EGR gas.

14 Claims, 2 Drawing Sheets

APPARATUS AND METHOD FOR CONTROLLING EXHAUST GAS RECIRCULATION

CROSS-REFERENCE TO RELATED APPLICATION

The present application claims priority of Korean Patent Application Number 10-2012-0031163 filed Mar. 27, 2012, the entire contents of which application is incorporated herein for all purposes by this reference.

BACKGROUND OF INVENTION

1. Field of Invention

The present invention relates to an exhaust gas recirculation control apparatus and an exhaust gas recirculation control method, and more particularly, to an exhaust gas recirculation control apparatus and an exhaust gas recirculation control method using a manifold absolute pressure (MAP) sensor.

2. Description of Related Art

Exhaust gas of an engine contains a large amount of toxic ingredients, such as CO, HC, and NOx (nitrogenous compound). Particularly, when a combustion temperature of the engine increases, the amount of generation of NOx increases, so that it is necessary to lower a combustion temperature of the engine in order to reduce the amount of NOx contained in the exhaust gas.

Among the reasons of the increase of the combustion temperature of the engine, a major reason is that high temperature heat is momentarily generated according to increase of a spread speed of flames ignited in an ignition plug in a state where an air-fuel ratio of air-fuel mixed gas inside a combustion chamber is in a rich state.

A method of lowering a combustion temperature of the engine in order to reduce the amount of NOx contained in the exhaust gas includes an exhaust gas recirculation (EGR) method of lowering a combustion temperature of an engine by decreasing a density of mixed gas without changing an inherent air-fuel ratio of the mixed gas by mixing a part of exhaust gas with fresh air and making mixed gas flow in a combustion chamber.

The exhaust gas recirculation (EGR) method is used for improving fuel efficiency of a gasoline engine, as well as reducing the amount of NOx contained in the exhaust gas. By using the exhaust gas recirculation (EGR) method, it is simultaneously possible to decrease the amount of NOx and advance an ignition timing while avoiding a knocking generation region. Accordingly, it is possible to improve output of the engine and fuel efficiency.

In order to accurately control the recirculation of the exhaust gas, the amount of EGR gas recirculated to the intake manifold needs to be accurately measured. A method of measuring the amount of EGR gas includes a method of measuring a flow rate of the EGR gas by installing a flow rate sensor in an EGR pipe.

As described above, when a separate sensor is installed in order to measure the amount of EGR gas recirculated to the intake manifold, an engine configuration becomes complex and a product cost increases due to the use of an additional component.

The information disclosed in this Background section is only for enhancement of understanding of the general background of the invention and should not be taken as an acknowledgement or any form of suggestion that this information forms the prior art already known to a person skilled in the art.

SUMMARY OF INVENTION

Various aspects of the present invention provide for an exhaust gas recirculation control apparatus and an exhaust gas recirculation control method having advantages of calculating the amount of EGR gas recirculated to an inlet manifold and controlling according to the calculated amount of the EGR gas while minimizing the number of mounted sensors.

Various aspects of the present invention provide for an exhaust gas recirculation control apparatus, including: an EGR valve configured to adjust a flow rate of EGR gas recirculated from an exhaust manifold to an intake manifold; a manifold absolute pressure (MAP) sensor configured to measure pressure inside the intake manifold; a throttle valve configured to control the amount of inflow air; an igniter configured to an engine; an injector configured to spray fuel; an acceleration pedal position sensor configured to measure an accelerator angle; a crank position sensor configured to measure revolutions per minute of the engine; a vehicle speed sensor configured to measure a speed of a vehicle; and a control portion configured to receive a signal of pressure inside the intake manifold from the MAP sensor, calculate a ratio of the EGR gas for a total volume of the intake manifold by using pressure variance inside the intake manifold, calculate pressure of the EGR gas by multiplying the pressure of the intake manifold and the ratio of the EGR gas, and convert the pressure of the EGR gas to a flow rate of the EGR gas.

The control portion may compensate an ignition timing of the engine by the flow rate of the EGR gas by advance controlling the igniter.

The control portion may calculate a flow rate of the EGR gas by applying the pressure of the EGR gas to a flow rate function according to an opened area of the EGR valve.

The control portion may calculate pressure of intake air by subtracting the calculated pressure of the EGR gas from the pressure inside the intake manifold, and convert the pressure of the intake air to a flow rate of the intake air.

The control portion may calculate the flow rate of the intake air flowing in the intake manifold using the temperature of the intake air, the volume of the intake manifold and the pressure of the intake air.

The control portion may control an operation of an injector by calculating the amount of fuel determined according to the flow rate of the intake air.

Various aspects of the present invention provide for an exhaust gas recirculation control method, including: measuring pressure inside an intake manifold by using an MAP sensor; calculating pressure of EGR gas by multiplying the pressure inside the intake manifold by a ratio of the EGR gas for a total volume of the intake manifold; and converting the pressure of the EGR gas to a flow rate of the EGR gas.

The converting of the pressure of the EGR gas to a flow rate of the EGR gas may include calculating the flow rate of the EGR gas by applying the pressure of the EGR gas to a flow rate function according to an opened area of an EGR valve configured to adjust the flow rate of the EGR gas recirculated from an exhaust manifold to the intake manifold.

The method may further include compensating an ignition timing of an engine according to the flow rate of the EGR gas calculated from the pressure of the EGR gas.

The method may further include: calculating pressure of the intake air supplied to the intake manifold by subtracting the calculated pressure of the EGR gas from a value of the pressure of the intake manifold; and converting the pressure of the intake air to a flow rate of the intake air.

The converting of the pressure of the intake air to the flow rate of the intake air may be realized using the temperature of the intake air, the volume of the intake manifold (20) and the pressure of the intake air.

The method may further include supplying fuel by calculating the amount of fuel determined according to the flow rate of the intake air calculated from the pressure of the intake air.

The ratio of the EGR gas for the total volume of the intake manifold may be calculated by using pressure variance inside the intake manifold.

The ratio of the EGR gas for the total volume of the intake manifold may be calculated based on an assumption that pressure variance inside the intake manifold is generated according to a change in opening of an EGR valve configured to adjust the flow rate of the EGR gas recirculated from an exhaust manifold to the intake manifold.

According to the various aspects of the present invention, it is possible to calculate the amount of EGR gas recirculated to the intake manifold by using the manifold absolute pressure (MAP) sensor mounted in the intake manifold, and it is not necessary to install a mass flow (MAF) sensor and the like for measuring the amount of EGR gas.

Because it is not necessary to separately install the MAP sensor and the like for measuring the amount of EGR gas, it is possible to simplify a configuration of the engine and reduce a product cost.

The methods and apparatuses of the present invention have other features and advantages which will be apparent from or are set forth in more detail in the accompanying drawings, which are incorporated herein, and the following Detailed Description, which together serve to explain certain principles of the present invention.

DETAILED DESCRIPTION

Figure 1:
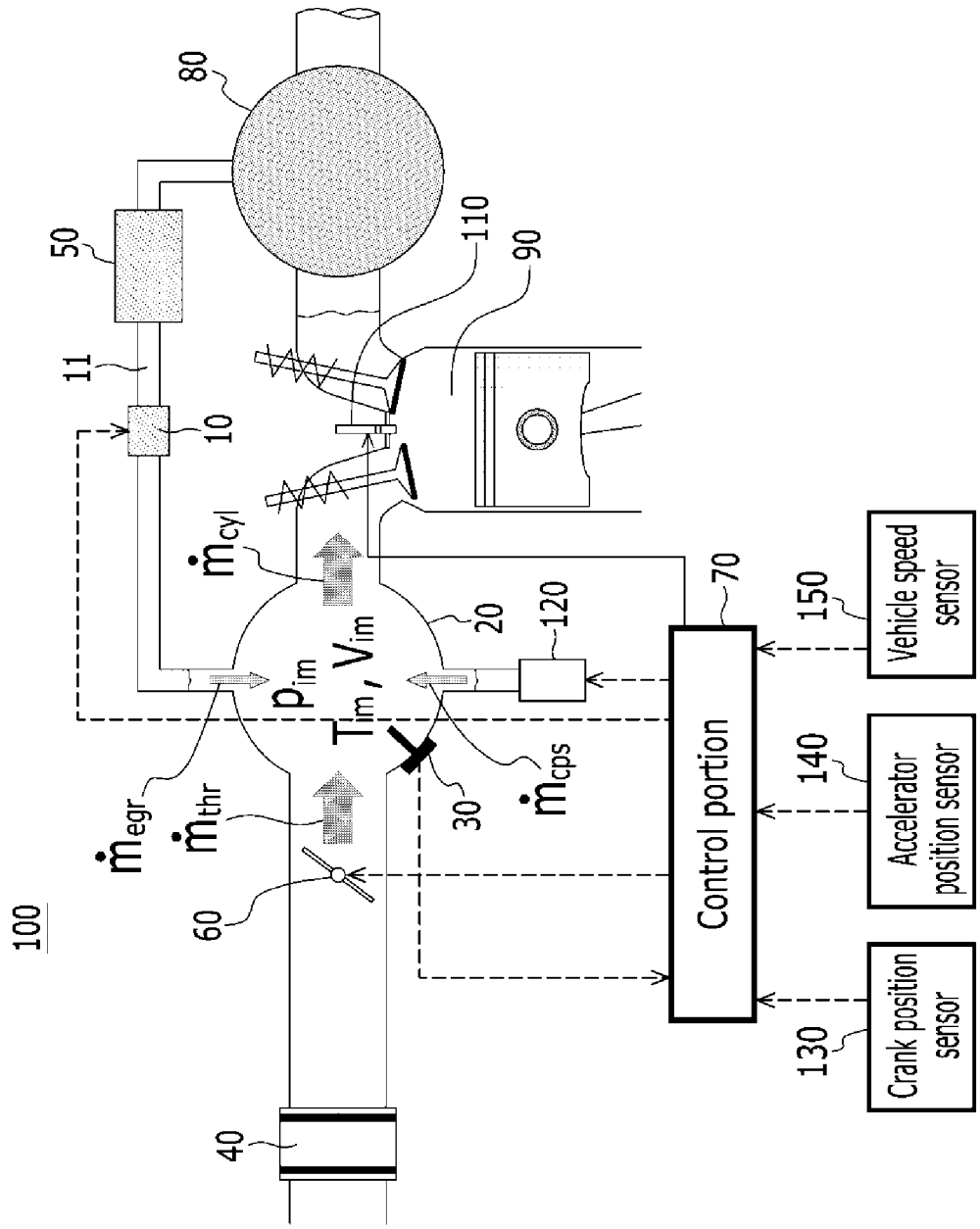
FIG. 1 is a block diagram illustrating an exemplary exhaust gas recirculation control apparatus according to the present invention.

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Like reference numerals designate like elements throughout the specification.

Throughout this specification and the claims that follow, when it is described that an element is "coupled" to another element, the element may be "directly coupled" to the other element or "electrically coupled" to the other element through a third element. Further, unless explicitly described to the contrary, the word "comprise" and variations such as "comprises" or "comprising", will be understood to imply the inclusion of stated elements but not the exclusion of any other elements.

FIG. 1 is a block diagram illustrating an exhaust gas recirculation control apparatus according to various embodiments of the present invention.

Referring to FIG. 1, an exhaust gas recirculation control apparatus 100 includes an exhaust gas recirculation (ECR) valve 10, a manifold absolute pressure (MAP) sensor 30, a throttle valve 60 for controlling the amount of inflow air, an igniter 110 for controlling combustion in an engine, an injector 120 for injecting fuel, an accelerator position sensor 103 for measuring an accelerator angle, a crank position sensor 140 for measuring revolutions per minute of the engine, a vehicle speed sensor 150 for measuring a speed of a vehicle, and a control portion 70.

The control portion 70 may be an engine control unit (ECU) for controlling a general operation of the engine.

The EGR valve 10 is installed on an EGR pipe 11 connecting an exhaust manifold 80 and an intake manifold 20. The EGR valve 10 adjusts flow of EGR gas recirculated from the exhaust manifold 80 to the intake manifold 20 under the control of the control portion 70. The EGR valve 10 may be operated by a solenoid method or a DC motor method.

The MAP sensor 30 is installed in the intake manifold 20 to measure pressure Pim inside the intake manifold and transmit a corresponding signal to the control portion 70.

The intake manifold 20 uniformly supplies air flowing in through an air cleaner 40 to a combustion chamber of the engine.

The throttle valve 60 is installed in an upstream of the intake manifold 20. The throttle valve 60 adjusts a flow rate $\dot{m}\_thr$ of intake air supplied to the intake manifold under the control of the control portion 70.

The control portion 70 may receive a pressure value Pim of the intake manifold from the MAP sensor 30, and calculate a flow rate $\dot{m}\_egr$ of the EGR gas by using the received pressure value Pim.

Further, the control portion 70 controls an operation of the igniter 110 by compensating an ignition timing according to the adjusted flow rate $\dot{m}\_egr$ of the EGR gas.

In addition, the control portion 70 may calculate a flow rate $\dot{m}\_thr$ of intake air supplied to the intake manifold by using the pressure Pim inside the intake manifold 20. Furthermore, the control portion 70 injects a predetermined flow rate of fuel $\dot{m}\_cps$ to the intake manifold 20 by controlling an operation of the injector 120 according to the adjusted flow rate $\dot{m}\_thr$ of the intake air, an engine load, and rpm. In a gasoline direct injection (GDI) engine, fuel may be directly injected inside the combustion chamber 90.

The accelerator position sensor 130 measures a position of an accelerator stepped by a driver and delivers a corresponding signal to the control portion 70.

The crank position sensor 130 measures revolutions per minute of a crank shaft and delivers a corresponding signal, that is, an rpm signal, to the control portion 70.

The vehicle speed sensor 150 measures a speed of the vehicle and delivers a corresponding signal to the control portion 70.

The exhaust gas recirculation control apparatus according to various embodiments of the present invention may further include an EGR cooler 50 provided on the ECR pipe 11.

Hereinafter, an exhaust gas recirculation control method using the exhaust gas recirculation control apparatus 100 will be described.

Figure 2:
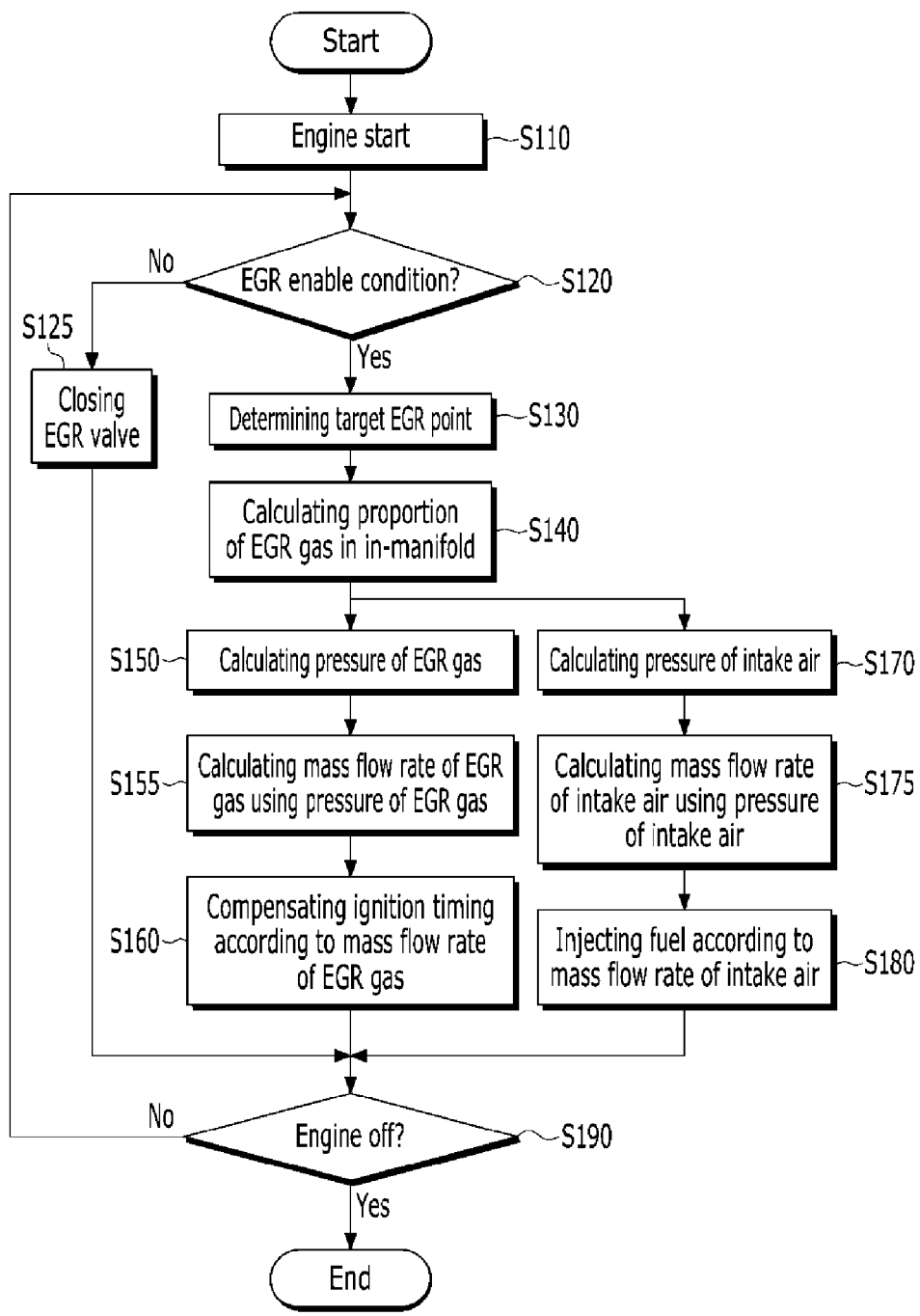
FIG. 2 is a flowchart illustrating an exemplary exhaust gas recirculation control method according to the present invention.

FIG. 2 is a flowchart illustrating the exhaust gas recirculation control method according to various embodiments of the present invention.

Referring to FIG. 2, when the engine is started (S110), the control portion 70 determines whether an EGR enable condition is met (S120). When the EGR enable condition meets a case in which a vehicle speed is equal or higher than a predetermined speed, for example, 20 km/h, in which revolutions per minute (RPM) of the engine are equal to or higher than a predetermined rpm, for example, 800 rpm, and a flow rate $\dot{m}\_cps$ of fuel injected according to the amount of intake air is equal to or larger than a reference value, the control portion 70 may determine that the EGR enable condition is met.

When the EGR enable condition is not met, the control portion 70 closes the EGR valve 10 by controlling an operation of the EGR valve 10 (S125).

When the EGR enable condition is met, the control portion 70 sets a target EGR point (S130). The target EGR point means a target flow rate of the EGR gas desired to be recirculated to the exhaust manifold from the exhaust manifold. In this case, the control portion 70 opens the EGR valve 10 to make the EGR gas flow in the intake manifold 20.

The target flow rate of the EGR gas may be determined by a predetermined map according to the accelerator position sensor 130, the crank position sensor 140, the vehicle speed sensor 150, the flow rate $\dot{m}\_cps$ of fuel, and the like.

According to inflow of the EGR gas and the intake air in the intake manifold 20, the pressure Pim inside the intake manifold 20 increases. The pressure Pim inside the intake manifold 20 is a sum of pressure by the EGR gas and pressure according to intake air. The pressure Pim inside the intake manifold 20 is measured by the MAP sensor 30.

The control portion 70 calculates a ratio of the EGR gas in a total volume of the intake manifold 20 (S140).

The control portion 70 calculates pressure of the EGR gas by multiplying the pressure Pim inside the intake manifold 20 measured through the MAP sensor 30 by the ratio of the EGR gas (S150).

The control portion 70 calculates the flow rate $\dot{m}\_egr$ of the EGR gas by using the pressure of the EGR gas (S155).

The control portion 70 calculates a temperature Tim of the intake manifold 20 by using, for example, the pressure of the EGR gas and a predetermined total volume Vim of the intake manifold 20 by using an equation of an ideal gas equation.

The flow rate $\dot{m}\_thr$ of the intake air may be calculated by using the total volume Vim of the intake manifold 20, the temperature Tim inside the intake manifold 20, and the pressure of the intake air among the pressure inside the intake manifold 20. Further, a temperature of the EGR gas and the fresh gas may be measured by including a separate temperature sensor in the intake manifold 20.

In the meantime, the control portion 70 may calculate a ratio of the EGR gas inside the intake manifold 20 by using a flow rate function according to an opened area of the EGR valve 10.

Equation 1 represents a flow rate function according to the opened area of the EGR valve 10.

$$\dot{m} = A*P*C*\Psi \quad \text{Equation 1}$$

<Equation of St. Venant>

Herein, $\dot{m}$ represents a flow rate of gas, A represents an opened area of the valve, P represents pressure of gas, C represents a temperature constant, and W is a pressure ratio.

Equation 1 may be applied as a flow rate function according to an opened area of the EGR valve 10. In this case, the opened area of the EGR valve 10 is a value determined according to the control of the control portion 70, and the temperature constant C may be determined by a preset map.

A volume of the exhaust manifold 80 is a predetermined value, and pressure and a temperature of the exhaust manifold 80 may be determined by a preset map through an experiment according to an operation state of the engine, that is, rpm, a vehicle speed, and the fuel flow rate $\dot{m}\_cps$.

Further, the pressure ratio $\Psi$ of the exhaust gas of the EGS gas discharged from the outlet manifold 80 and passing through the EGR valve 10 may be determined by a preset map through an experiment.

Even when the EGR cooler 50 included in the EGR pipe 11 is further included, the pressure ratio $\Psi$ of the exhaust gas may be determined by a preset map through an experiment.

Accordingly, it is possible to calculate a flow rate of the EGR gas by applying the pressure of the EGR gas to the flow rate function of Equation 1.

When the control portion 70 controls the opening of the EGR valve 10 by setting the target EGR point (S130), the pressure inside the intake manifold 20 is changed, and the changed pressure is calculated as pressure variance of the EGR gas to determine a ratio of the EGR gas inside the intake manifold 20. The ratio of the EGR gas inside the intake manifold 20 may be determined by converting pressure variance by the opening of the EGR valve 10 to the ratio of the EGR gas in gas inside the intake manifold 20 according to the map preset through the experiment.

The control portion calculates the pressure of the EGR gas by multiplying the pressure Pim inside the intake manifold 20 measured through the MAP sensor 30 by the ratio of the EGR gas (S150).

Further, a flow rate $\dot{m}\_egr$ of the EGR gas may be calculated by substituting the calculated pressure of the EGR gas to Equation 1 (S155).

The control portion 70 compensates an ignition timing of the engine by advance controlling an operation of the igniter 110 according to the flow rate $\dot{m}\_egr$ of the EGR gas (S160).

The control portion 70 calculates the pressure of the intake air by subtracting the pressure of the EGR gas from the pressure of the intake manifold measured through the MAP sensor 30 (S170).

The control portion 70 calculates a temperature Tim of the intake manifold 20 by using the pressure of the EGR gas and the determined total volume Vim of the intake manifold 20 by using, for example, an ideal gas equation.

The control portion 70 may calculate a flow rate $\dot{m}\_thr$ of intake air by using the pressure and the temperature Tim of the intake air (S175).

If the MAP sensor 30 is a sensor capable of measuring a temperature, the MAP sensor 30 may calculate the flow rate $\dot{m}\_thr$ of intake air by measuring the temperature Tim of the intake manifold 20 (S175).

The control portion 70 may calculate the flow rate $\dot{m}\_thr$ of intake air flowing in the intake manifold for a unit time using the temperature of the intake air, the volume of the intake manifold (20) and the pressure of the intake air.

The control portion 70 controls the operation of the injector 120 by determining the amount of fuel determined according to the flow rate $\dot{m}\_thr$ of intake air (S180).

The control portion 70 determines whether the engine is off (S190).

When the engine starting is not off, the control portion 70 controls the exhaust gas recirculation apparatus adaptively to an operation condition change of the vehicle by repeatedly performing from step S120 of determining whether the EGR enable condition is met to step S180 of injecting the fuel.

According to various embodiments of the present invention, it is possible to reduce the number of sensors for controlling a flow rate and an ignition timing of the EGR gas, and the amount of fuel sprayed, thereby decreasing costs of the vehicle.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An apparatus for controlling exhaust gas recirculation, comprising:
   an EGR valve configured to adjust a flow rate of EGR gas recirculated from an exhaust manifold to an intake manifold;
   a manifold absolute pressure (MAP) sensor configured to measure pressure inside the intake manifold;
   a throttle valve configured to control the amount of inflow air;
   an igniter configured to an engine;
   an injector configured to inject fuel;
   an acceleration pedal position sensor configured to measure an accelerator angle;
   a crank position sensor configured to measure revolutions per minute of the engine;
   a vehicle speed sensor configured to measure a vehicular speed; and
   a control portion configured to receive a signal of pressure inside the intake manifold from the MAP sensor, calculate a ratio of the EGR gas for a total volume of the intake manifold by using pressure variance inside the intake manifold, calculate pressure of the EGR gas by multiplying the pressure of the intake manifold and the ratio of the EGR gas, and convert the pressure of the EGR gas to a flow rate of the EGR gas.

2. The apparatus of claim 1, wherein:
   the control portion compensates an ignition timing of the engine by the flow rate of the EGR gas by advance controlling the igniter.

3. The apparatus of claim 1, wherein:
   the control portion calculates a flow rate of the EGR gas by applying the pressure of the EGR gas to a flow rate function according to an opened area of the EGR valve.

4. The apparatus of claim 1, wherein:
   the control portion calculates pressure of intake air by subtracting the calculated pressure of the EGR gas from the pressure inside the intake manifold, and converts the pressure of the intake air to a flow rate of the intake air.

5. The apparatus of claim 4, wherein:
   the control portion calculates the flow rate of the intake air flowing in the intake manifold using the temperature of the intake air, the volume of the intake manifold and the pressure of the intake air.

6. The apparatus of claim 4, wherein:
   the control portion controls an operation of the injector by calculating the amount of fuel determined according to the flow rate of the intake air.

7. A method of controlling exhaust gas recirculation, comprising:
   measuring pressure inside an intake manifold by using an MAP sensor;
   calculating pressure of EGR gas by multiplying the pressure inside the intake manifold by a ratio of the EGR gas for a total volume of the intake manifold; and
   converting the pressure of the EGR gas to a flow rate of the EGR gas.

8. The method of claim 7, wherein:
   the converting of the pressure of the EGR gas to a flow rate of the EGR gas comprises:
   calculating the flow rate of the EGR gas by applying the pressure of the EGR gas to a flow rate function according to an opened area of an EGR valve configured to adjust the flow rate of the EGR gas recirculated from an exhaust manifold to the intake manifold.

9. The method of claim 7, further comprising:
   compensating an ignition timing of an engine according to the flow rate of the EGR gas calculated from the pressured of the EGR gas.

10. The method of claim 7, further comprising:
    calculating pressure of the intake air supplied to the intake manifold by subtracting the calculated pressure of the EGR gas from a value of the pressure of the intake manifold; and
    converting the pressure of the intake air to a flow rate of the intake air.

11. The method of claim 10, wherein:
    the converting of the pressure of the intake air to the flow rate of the intake air is realized using the temperature of the intake air, the volume of the intake manifold (20) and the pressure of the intake air.

12. The method of claim 10, further comprising:
    supplying fuel by calculating the amount of fuel determined according to the flow rate of the intake air calculated from the pressure of the intake air.

13. The method of claim 7, wherein:
    the ratio of the EGR gas for the total volume of the intake manifold
    is calculated by using pressure variance inside the intake manifold.

14. The method of claim 7, wherein:
    the ratio of the EGR gas for the total volume of the intake manifold
    is calculated based on an assumption that pressure variance inside the intake manifold is generated according to a change in opening of an EGR valve configured to adjust the flow rate of the EGR gas recirculated from an exhaust manifold to the intake manifold.

* * * * *